United States Patent [19]

McNaught

[11] 4,409,778
[45] Oct. 18, 1983

[54] CROP COLLECTING APPARATUS

[75] Inventor: James B. McNaught, St. Germain en Laye, France

[73] Assignee: Massey-Ferguson Services N.V., Curacao, Netherlands Antilles

[21] Appl. No.: 299,034

[22] PCT Filed: Dec. 19, 1980

[86] PCT No.: PCT/GB80/00223
§ 371 Date: Aug. 31, 1981
§ 102(e) Date: Aug. 31, 1981

[87] PCT Pub. No.: WO81/01938
PCT Pub. Date: Jul. 23, 1981

[30] Foreign Application Priority Data

Jan. 10, 1980 [GB] United Kingdom ................. 8000916

[51] Int. Cl.³ ...................... A01D 41/06; A01D 45/00
[52] U.S. Cl. ...................................... 56/10.2; 56/208; 56/DIG. 15
[58] Field of Search ................ 56/10.2, 203, DIG. 15, 56/209

[56] References Cited

U.S. PATENT DOCUMENTS

| | | | |
|---|---|---|---|
| 2,750,727 | 6/1956 | Wright | 56/DIG. 15 |
| 3,509,701 | 5/1970 | Clarke | 56/208 |
| 3,747,311 | 7/1973 | DeCoenb et al. | 56/208 |
| 3,908,345 | 9/1975 | Oni et al. | 56/208 |
| 4,124,970 | 11/1978 | Barnhardt | 56/10.2 |
| 4,171,606 | 10/1979 | Ziegler et al. | 56/10.2 |
| 4,193,200 | 3/1980 | Kessens et al. | 56/208 |
| 4,204,383 | 5/1980 | Milliken, Jr. | 56/DIG. 15 |
| 4,211,057 | 7/1980 | Dougharty et al. | 56/208 |

FOREIGN PATENT DOCUMENTS

| | | | |
|---|---|---|---|
| 1457960 | 4/1969 | Fed. Rep. of Germany | 56/208 |
| 1124111 | 8/1966 | United Kingdom | 56/208 |
| 1113334 | 5/1968 | United Kingdom | 56/208 |
| 1121874 | 7/1968 | United Kingdom | 56/208 |

Primary Examiner—Paul J. Hirsch
Attorney, Agent, or Firm—Robert L. Farris

[57] ABSTRACT

Crop collecting apparatus comprising a platform (1) adapted for pivotal up and down movement about an axis that is located at the rear of the platform and extends transversely with respect to the direction of usual forwards motion of the apparatus, the platform comprising a leading section (11) and a rear section (4) hinged together about an intermediate transverse axis (12) extending parallel to said rear axis, and actuation means (3) provided to pivot the platform about the rear axis so as to raise and lower the platform relative to the ground, support means (23) connected between the leading and rear sections (11,4) of the platform (1) so as to support the weight of the leading section and allow it to pivot within a pre-set angular range, sensor means (29,30) that senses when the leading section (11) reaches the limits of the pre-set angular range, and control means (33,34,35) provided to control operation of the actuation means (3) in a manner dependent upon operation of the sensor means (29,30) so that in use the leading section (11) pivots within said pre-set angular range and the whole platform (1) is respectively raised and lowered when the leading section (11) reaches the upper and lower limits of said angular range of movement. The support means (23) may comprise a variable length strut and the leading section (11) may carry a skid (22) through which it engages the ground. Alternatively, the support means may comprise secondary actuation means (23) that operates together with the main actuation means (3). An automatic table height control system may be included.

4 Claims, 3 Drawing Figures

CROP COLLECTING APPARATUS

TECHNICAL FIELD

This invention relates to crop collecting apparatus for a grain harvesting machine, such as the crop collecting table of a combine harvester.

In our British Pat. No. 1,479,270 we proposed a crop collecting table comprising a platform carrying crop cutting means along its leading edge and an endless belt type conveyor to receive cut crop and convey it rearwards, the cutting means and conveyor both being mounted on the platform so that they can swing up and down about a transverse pivot axis so as to follow ground contours. Hydraulic rams are provided to raise and lower the platform but the cutting means and conveyor are left free to ride over the ground in use. Variation of the height of the platform thus varies the forward inclination of the crop cutting means and conveyor.

Crop collecting tables are also known, such as shown in our British Pat. No. 1,124,111, which are fully supported by hydraulic rams above the ground and which are provided with a height control system including ground sensing means that senses variations in the height of the ground and causes the rams to vary the position of the table so that it is maintained at a pre-set constant height above the ground. However, the responsiveness of such a system and the power required to operate it is affected adversely by the increased weight of larger tables.

DISCLOSURE OF THE INVENTION

An object of the present invention is to provide a crop collecting table that is adapted to follow ground contours with the crop cutting means maintained within an optimum range of forward inclinations and the operation of which is inherently less sensitive to table weight than the known tables with automatic height control systems.

This object is achieved according to the present invention by providing a crop collecting platform adapted for pivotal up and down movement about an axis that is located at the rear of the platform and extends transversely with respect to the direction of usual forwards motion of the apparatus, the platform comprising a leading section and a rear section hinged together about an intermediate transverse axis extending parallel to said rear axis, and actuation means provided to pivot the platform about the rear axis so as to raise and lower the platform relative to the ground and characterised by support means connected between the leading and rear sections of the platform so as to support the weight of the loading section and allow it to pivot within a preset angular range, sensor means that senses when the leading section reaches the limits of said pre-set angular range, and control means provided to control operation of the actuation means in a manner dependent upon operation of the sensor means so that in use the leading section pivots within said pre-set angular range and the whole platform is respectively raised and lowered when the leading section reaches the upper and lower limits of said angular range of movement.

The invention therefore divides operation of the platform between initial operation of a leading section of the platform and subsequent operation of the whole platform. This allows the leading section to be made light and responsive in its movements and reduces the operating power requirements by reducing the need to pivot the whole platform. Further, by limiting angular movement of the leading section of the platform, the forward inclination of the leading section can be maintained close to the optimum value for crop collection.

The leading section of the platform may ride over the ground on skids so that it pivots about the intermediate transverse axis as it follows ground contours. This pivotal movement acts through the sensor and control means to control the actuation means so as to maintain the leading section within its pre-set range of angular movement. The support means supports the majority of the weight of the leading section in use so that the leading section "floats" over the ground and yet still follows ground contours through that component of its weight acting through the skids on the ground. The support means may be spring or fluid struts that support the weight of, and dampen movement of, the leading section.

In an alternative embodiment, the platform may incorporate an automatic height control system including ground engaging feelers on the leading section that move relative to the leading section in following ground contours and control the actuation means in accordance with this relative movement. The feelers are adapted to support a component of the weight of the leading section so that in use on level ground at the selected height they assume an optimum intermediate position relative to the leading section and support the leading section within its predetermined angular range. Preferably, the feelers and support means are adapted so that the leading section moves to follow minor changes in ground contours before the height control system operates the actuation means. At the angular limits of the leading section the control means will still operate to maintain the leading section within said limits.

In yet another embodiment, the support means may comprise secondary actuation means that is provided to pivot the leading section of the platform about the intermediate transverse axis under control of the control means so that pivotal movement of the leading section is positively controlled, at least at said limits.

The main and secondary actuation means may fully support the platform above the ground without skids, the control means operating to control both actuation means so as to maintain the required angular relationship between the leading and rear sections. The control means preferably includes manually operable means whereby an operator can initiate raising and lowering of the platform so as to select the operating height of the leading section above the ground. Further, the control means may include ground engaging feelers located on the platform so as to sense the ground and initiate raising and lowering of the platform to give automatic table height control.

The limits of said pre-set range of angular movement of the leading section of the platform may be sensed by any suitable sensor means. For example, electrical sensors may be provided that are triggered at each of said respective limits. These sensors may be associated with the support means so as to be operated by movement of the support means with the leading section.

DESCRIPTION OF THE DRAWINGS

The invention will now be described by way of example with reference to the accompanying drawings in which.

BEST MODE OF CARRYING OUT INVENTION

Figure 1:
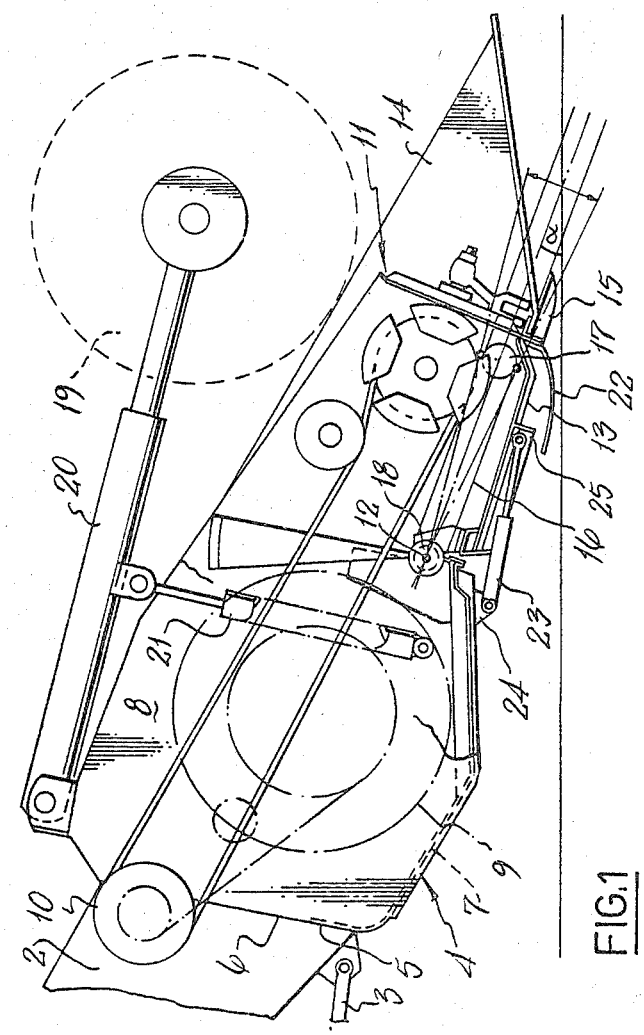
FIG. 1 is a side elevation of a crop collecting table according to the invention.

The combine table illustrated in FIG. 1 comprises a platform 1 that is adapted for connection to the lower end of a crop elevator 2 at the front of a combine. The elevator is pivoted at its upper end about a transverse axis, and a pair of hydraulic rams 3 are connected between the chassis of the combine and the elevator so as to control raising and lowering of the elevator and the platform connected to it.

The platform itself comprises a rear section 4 having a rear wall 5 with a crop outlet opening 6 communicating with the elevator 2, a floor 7 and side walls 8 with a table auger 9 rotatably supported between the side walls and adapted to feed crop axially inwards and through the opening 6 in the rear wall 5 when rotated by a drive mechanism 10 mounted on one side wall 8.

The platform also has a leading section 11 that is pivotably connected to the rear section 4 about an intermediate transverse axis 12 and has a floor 13 and side walls 14. The leading section 11 carries a cutterbar 15 along its leading edge and supports a belt-type crop conveyor 16 that runs on parallel rollers 17, 18 front and rear, and carries cut crop rearwards to the auger 9. The axis of the rear rollers 18 is coincident with the pivot axis 12 between the rear and leading sections of the platform. The cutterbar 15 and conveyor 16 are driven by the drive mechanism 10.

A crop collecting reel 19 is supported over the cutterbar 15 between a pair of pivoted arms 20 that extend forwards from the rear section 4. The arms 20 are hydraulically extendible and are pivoted by hydraulic rams 21. The reel 19 is hydraulically driven.

A fixed ground engaging skid or skids 22 are provided beneath the leading edge of the leading section 11 of the platform so as to run over the ground when in use.

A pair of hydraulic struts 23 are connected between the rear and leading sections of the platform 4, 11 so as to support the weight of the leading section. As shown in FIG. 1, the struts 23 are connected between brackets 24, 25 fixed to the underside of the rear and leading sections but it will be appreciated that they could equally well be connected between the side walls 8, 14 of the rear and leading sections. Each strut 23 comprises a piston and cylinder with hydraulic connections 26 from both sides of the piston to a hydraulic accumulator 27 so that the strut can extend and retract to allow pivotal movement of the leading section 11 relative to the rear section 4. The struts 23 are adapted to support the majority of the weight of the leading section when the platform is in use with the skid 22 in contact with the ground so that the leading section floats over the ground and pivots about its rear axis 12 to follow ground contours.

A bi-directional flow constrictor 28 is provided in the hydraulic connections 26 so as to dampen movement of the struts and thereby avoid uncontrolled movements of the leading section such as bouncing over local bumps.

The platform is designed for optimum performance with the leading section 11 inclined at an angle $\alpha$ to the ground, and the struts 23 are adapted to allow pivotal movement of the leading section on either side of this optimum inclination. Further sensors 29, 30 are provided to detect angular limits equispaced either side of said optimum inclination and to trigger operation of the rams 3 to raise and lower the platform so as to maintain the inclination of the leading section within said limits.

Figure 2:
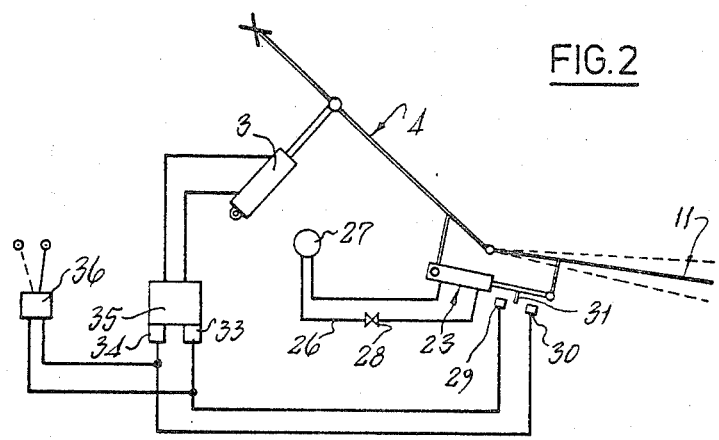
FIG. 2 is a schematic diagram of the pivot control system for the table of FIG. 1.

As indicated in FIG. 2, the sensors 29, 30 may be associated with the struts 23 so as to be operated by movement of the struts to positions corresponding to the limits of angular movement of the leading section of the platform. For example, the sensors 29, 30 may each comprise a proximity switch that is fixed relative to the cylinder of one of the struts 23 and is operated at a respective one of said limits by an iron member 31 connected to the piston rod 32 of the strut. Each proximity switch 29, 30 includes a reed switch and a magnet which creates a magnetic field to hold the reed switch open, this magnetic field being interrupted by the proximity of said iron member 31 and causing the reed switch to close. Each proximity switch 29, 30 controls operation of a respective solenoid 33, 34 of a solenoid-operated hydraulic control valve 35 connected to the rams 3 such that operation of the switch 29 at the lower limit causes energization of the solenoid 33 to retract the rams 3 and thus lower the platform to reduce the angle of inclination of the leading section, and operation of the switch 30 at the upper limit causes energization of the solenoid 34 to extend the rams 3 and thus raise the platform to increase the angle of inclination of the leading section.

The struts 23 may be adapted to support the full weight of the leading section when it is raised off the ground by the rams 3. Alternatively, separate stop means may be provided to support the full weight of the leading section in a lowest position when raised off the ground.

Manual control means 36 is provided to control lowering and raising of the platform through the solenoids 33, 34, respectively, the operation of the raise solenoid 34 by the manual control means 36 serving to override any lower signal from the lower limit proximity switch 29.

Figure 3:
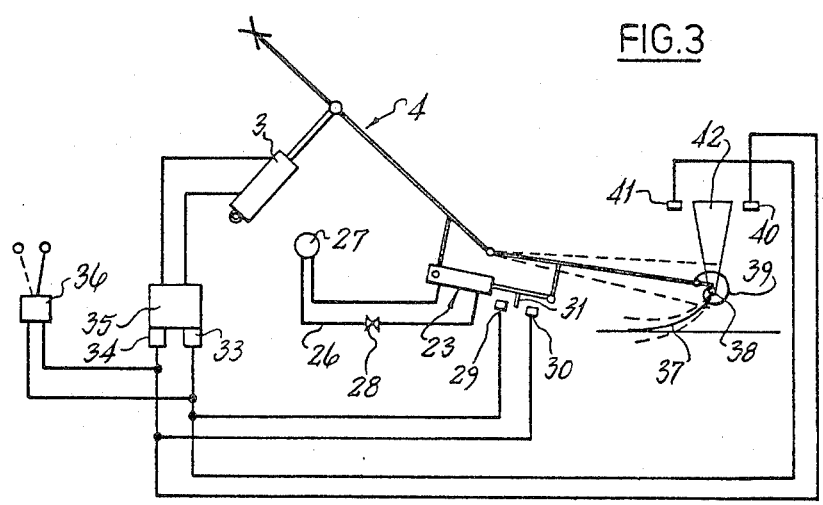
FIG. 3 is a schematic diagram of a crop collecting table including a pivot control system similar to that of FIG. 2 and incorporating an automatic height control system.

An alternative embodiment of the invention is illustrated in FIG. 3 which incorporates an automatic table height control system including feeler means comprising a plurality of curved fingers 37 that are rigidly connected to a transverse shaft 38 beneath the leading edge of the leading section 11 so as to trail behind the shaft with one or more in contact with the ground. Spring means 39 is provided that acts between the shaft and the leading section so as to urge the fingers downwards onto the ground and thereby exert an upwards reaction on the leading section to support it above the ground. Support means such as struts 23 are connected between the rear and leading sections of the platform, as shown in FIGS. 1 and 2, and sensors 29, 30 are provided to sense the limits of angular movement of the leading section and to trigger respective lowering and raising of the leading section through operation of the rams 3, as already described in relation to FIG. 2.

The table height control system also includes two sensors 40, 41 that sense movement of the fingers 37 to an extreme angular position either side of an intermediate position corresponding to the normal position for a selected height of the leading section above the ground.

These sensors 40, 41 are shown schematically in FIG. 3, but may comprise proximity switches operated by an arcuate iron member 42 that rotates with the shaft 38 relative to the switches. Adjustment of the table height can be made by adjustment of the proximity switches relative to said iron member so that they are operated when the iron member and thus the fingers 37 are in a different angular position corresponding to the newly selected height for the platform. A table height control system of this kind is disclosed in our British Pat. No. 1,581,010.

Each proximity switch 40, 41 controls operation of a respective solenoid 33, 34 of the hydraulic control valve 35 connected to the rams 3 so that operation of the switch 40 when the feelers 37 pivot upwards causes energization of the solenoid 33 to retract the rams 3 and thereby lower the platform, and operation of the switch 41 when the feelers 37 pivot downwards causes energization of the solenoid 34 to extend the rams 3 and thereby raise the platform. Thus an increase in the height of the ground pivots the fingers upwards and operates the switch 40 to cause the rams to raise the platform, and a fall in the height of the ground allows the fingers to pivot downwards and operates the switch 40 to cause the rams to lower the platform. The platform is therefore maintained at a constant preselected height above the ground.

It will be appreciated that the speed of pivotal movement of the feelers 37 and the leading section 11 can be related so that the leading section 11 under normal conditions will pivot within its angular range before the feelers pivot enough to trigger operation of the rams. In this way, ground following is achieved at the selected height by making maximum use of the floating action of the leading section and involving minimum operation of the rams. Further, operation of the leading section within the preselected angular range is still assured.

In alternative embodiments of the invention the relative speed of pivotal response of the feelers and leading section of the table can be adjusted so as to cause the rams 3 to be triggered at the limits of angular movement of the leading section before being triggered by the feelers.

In the embodiments described so far the support means 23 comprise hydraulic struts but it will be appreciated that other struts such as mechanical spring loaded struts could be used instead to perform the same function. Also, in other embodiments of the invention the sensors 29, 30 and 40, 41 could be non-electrical. For example, mechanical sensors could be provided that are incorporated in a mechanical control system linking pivotal movement of the leading section or feelers to operation of the hydraulic control valve 35 that controls actuation of the rams 3. British Pat. No. 1,124,111 discloses such a mechanical system as applied to an automatic table height control system, a cam follower mechanism and a Bowden cable be provided to connect the feelers to the hydraulic valve controlling the arms. This could be used in place of the sensors 40, 41 and solenoids 33, 34 of the hydraulic control valve 35. The sensors 29, 30 could be replaced by a similar mechanical system linking pivotal movement of the leading section to the control valve 35 and incorporating a lost motion mechanism so as to operate the latter at each of the angular limits of the leading section.

The construction of the feelers disclosed in British Pat. No. 1,124,111 could be used in the embodiment of FIG. 3 with the addition of the spring means 39 to urge the feelers downwards.

In the embodiments described so for the support means 23 have taken the form of struts that support the leading section of the platform from the rear section and allow pivotal movement of the leading section. These struts are essentially passive devices. However, in other embodiments of the invention the support means may comprise active devices such as hydraulic rams that are controlled so as to positively pivot the leading section of the platform about the intermediate transverse axis 12 and thereby control its inclination relative to the rear section.

Thus in the embodiment of FIG. 1 the struts 23 could be replaced by secondary rams that are connected in a control system with the rams 3 so that the two operate together with the secondary rams 23 pivoting within said angular limits for initial adjustment and the main rams 3 operating to pivot the whole platform once said angular limits are reached by the leading section, the leading section then preferably being returned by the secondary rams to the optimum inclination. The angular limits of the leading section are detected by sensors incorporated in the control system that may be similar to the sensors 29, 30 described above.

The main and secondary rams 3, 23 may fully support the platform above the ground. Manual control means is provided to allow the operator to raise and lower the platform so as to select the operating height of the leading section above the ground.

Further, the control means may include an automatic table height control system comprising ground engaging feeler means below the leading end of the platform. The systems described above and in British Pat. Nos. 1,124,111 and 1,581,010 could be used.

I claim:

1. Crop collecting apparatus comprising a platform adapted for pivotal up and down movement about an axis that is located at the rear of the platform and extends transversely with respect to the direction of usual forward motion of the appparatus, the platform comprising a leading section and a rear section hinged together about an intermediate transverse axis extending parallel to said rear axis, primary actuation means provided to pivot the platform about the rear axis so as to raise and lower the platform relative to the ground, secondary actuation means connected between the leading and rear sections of the platform so as to positively control pivoting of the leading section within a pre-set angular range of movement relative to the rear section; first sensor means that senses when the leading section reaches the limits of the pre-set angular range, second sensor means that senses the height of the leading section above the ground, and platform height control means simultaneously connected to both the first and second sensor means to control operation of the primary and secondary actuation means in a manner dependent upon operation of said first and second sensor means so that in use the leading section is pivoted within said pre-set angular range and the whole platform is respectively raised and lowered when the leading section reaches the upper and lower limits of said angular range of movement, thereby to maintain the leading section at a predetermined height above the ground.

2. Apparatus as claimed in claim 1 further characterised in that the control system is such that the secondary actuation means (23) pivot the leading section (11) within said angular limits for initial adjustment, and the main actuation means (3) pivot the whole platform once said angular limits are reached by the leading section (11).

3. Apparatus as claimed in claim 1 further characterised in that the main and secondary actuation means (2, 23) fully support the platform above the ground.

4. Apparatus as claimed in claim 1 further characterised in that it includes an automatic table height control system comprising ground engaging feeler means (37) below the leading end of the platform to sense the ground and initiate raising and lowering of the platform.

* * * * *